United States Patent [19]

Kinney et al.

[11] Patent Number: 4,519,409
[45] Date of Patent: May 28, 1985

[54] AWNING ADAPTED TO BE ATTACHED TO BUMPER OF AUTOMOBILE

[75] Inventors: Roger D. Kinney, Gahanna; Raymond J. Federowicz, Reynoldsburg, both of Ohio

[73] Assignee: Topper International Enterprises, Gahanna, Ohio

[21] Appl. No.: 504,009

[22] Filed: Jun. 13, 1983

[51] Int. Cl.³ .............................................. A45F 1/14
[52] U.S. Cl. ...................................... 135/88; 296/163
[58] Field of Search ................. 165/88, 89; 160/22, 160/65, 76, 77, 69, 70, DIG. 4, DIG. 5; 296/163, 102, 104, 105, 106

[56] References Cited

U.S. PATENT DOCUMENTS

| | | | |
|---|---|---|---|
| Re. 29,264 | 6/1977 | Woodward | 135/88 X |
| 698,371 | 4/1902 | Buschemeyer | 160/22 |
| 1,722,533 | 7/1929 | McWane | 135/88 |
| 1,962,388 | 6/1934 | Crane | 135/88 X |
| 2,481,230 | 9/1949 | MacDonald, Jr. | 135/88 X |
| 2,642,587 | 6/1953 | Taylor | 135/88 X |
| 3,020,919 | 2/1962 | Crump | 135/106 X |
| 3,115,362 | 12/1963 | Spurrier | 135/88 X |
| 3,209,770 | 10/1965 | Lingley | 135/88 X |
| 4,250,906 | 2/1981 | Rivier et al. | 135/88 |
| 4,310,194 | 1/1982 | Biller | 135/88 X |

FOREIGN PATENT DOCUMENTS 1603334 11/1981 United Kingdom ................. 135/88

Primary Examiner—Robert A. Hafer
Assistant Examiner—Arnold W. Kramer
Attorney, Agent, or Firm—John L. Gray

[57] ABSTRACT

An awning, cantilever supported on vertical posts, attached to the bumper of a motor vehicle with a portion of the awning extending for engagement with the wheel wells is disclosed. Preferably this device is attached to the rear of the motor vehicle with the trunk lid raised and may be used for picnics, tailgate parties, as a shelter at the beach, for watching sporting events, etc. It may also be attached to the front bumper of the motor vehicle, if desired.

5 Claims, 7 Drawing Figures

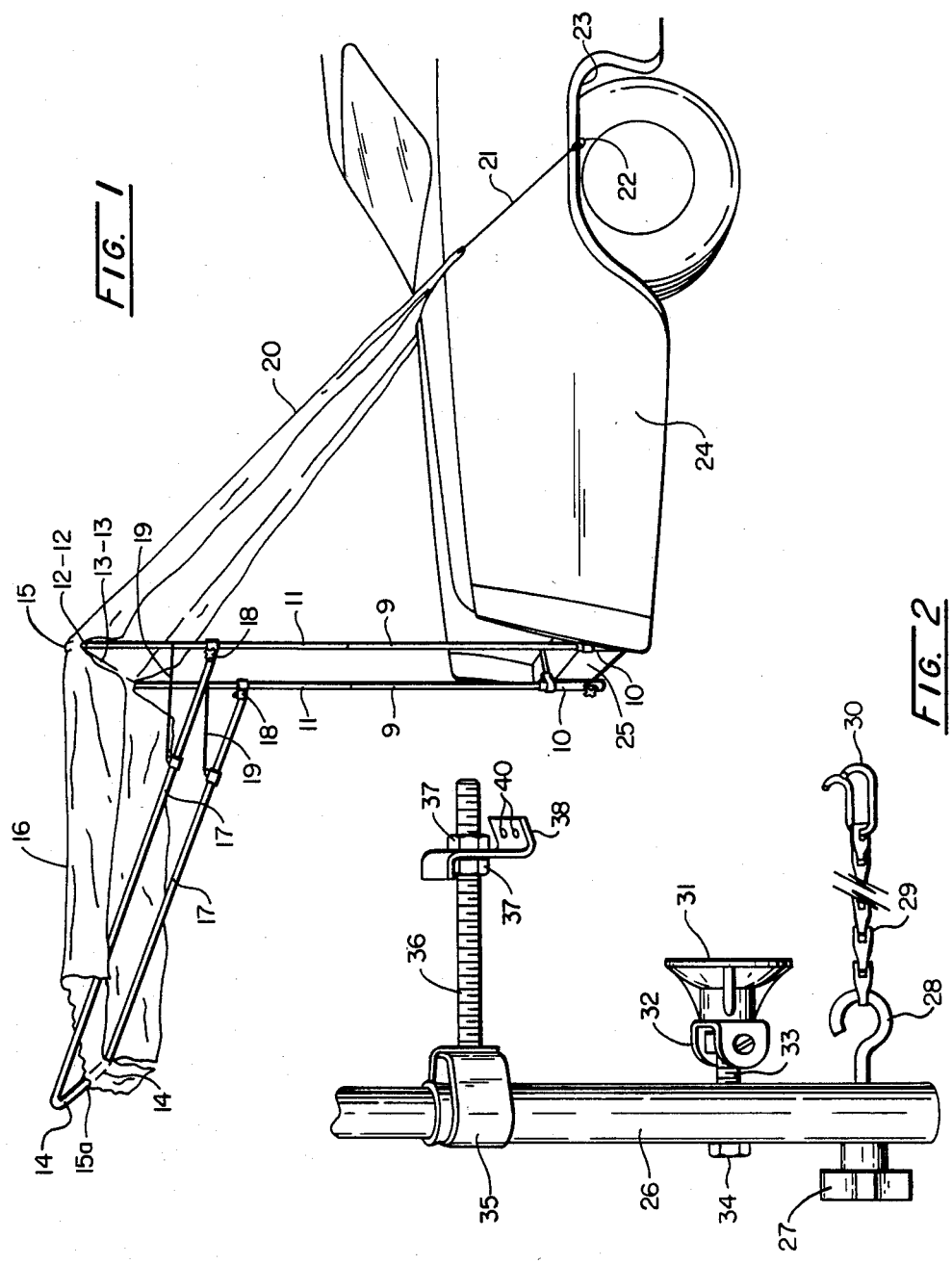

AWNING ADAPTED TO BE ATTACHED TO BUMPER OF AUTOMOBILE

BACKGROUND OF THE INVENTION

Outdoor activities utilizing a motor vehicle involve many millions of people all over the world. Camping, sports activities, swimming, etc., oftentimes require the need to shield individuals from sun or rain in close proximity to a motor vehicle. Awning assemblies are oftentimes used in connection with trailers or recreational vehicles. For example, a type of side-mounted awning is shown in U.S. Pat. No. 3,918,510, Hayward. Rear-moounted, collapsible shelters of a tent-like character are exemplified by U.S. Pat. No. 3,020,919, Krump, and U.S. Pat. No. 3,486,513, Fulsebakke. A tent for a rear-door vehicle is shown in U.S. Pat. No. 3,746,386, Woodward. U.S. Pat. No. 3,863,977, Hardinge, also shows a collapsible shelter attached to the rear of a vehicle.

None of the above references disclose a cantilevered awning arrangement which is supported only by the bumper and wheel wells of the vehicle and which may be readily assembled or disassembled for transportation within the vehicle or its trunk and which may be attached to any of the five currently existing bumper configurations of existing established motor vehicles.

U.S. Pat. No. 4,200,115, Parker, discloses a side-mounted cantilevered awning which is supported by members which are held in place by placing them beneath the motor vehicle's wheels. Thus, this awning is not attached to the vehicle but merely held in a cantilevered position by means of the weight of the vehicle itself.

A number of devices exist for carrying objects or supporting objects utilizing the bumper of a vehicle such as U.S. Pat. No. 2,379,994, Schwinn, U.S. Pat. No. 2,415,286, Hyde, U.S. Pat. No. 2,762,542, Hodgeman, U.S. Pat. No. 3,877,622, McLain, U.S. Pat. No. 3,891,132, Chandler, U.S. Pat. No. 3,924,787, Gothrup, U.S. Pat. No. 4,128,195, Collins, U.S. Pat. No. 4,318,501, Graber, and U.S. Pat. No. 3,161,973, Hastings. While these devices fit specific bumper configurations, none of them are adaptable to fit all of the five established bumper configurations in use.

SUMMARY OF THE INVENTION

The invention involves an awning which is cantilever supported on vertical posts which in turn are attached to the bumper of a motor vehicle with a universal attaching mechanism which can be used to attach this device or any other vertical post to any bumper on any style of existing established motor vehicle. A portion of the awning extends toward the body of the motor vehicle with adjustable straps which may attach that portion of the awning to the front or rear wheel wells. The device is preferably attached to the rear bumper and rear wheel wells of the motor vehicle with the trunk lid raised and may be used for picnics, tailgate parties, as a shelter at the beach, for watching sporting events, etc. It may also be attached to the front bumper of the motor vehicle, if desired. In that case, the cantilevered portion of the awning will extend outwardly from the front of the car and the other portion of the awning will extend down over the hood of the motor vehicle, and the straps may be attached to the forward wheel wells.

It is therefore an object of this invention to provide an awning and support mechanism which may be attached to the rear or front bumper of a motor vehicle and also supported by attachment to the wheel wells of the motor vehicle so as to provide a cantilevered rearwardly or forwardly extending awning to provide shelter from the sun or rain to the individual occupants of the motor vehicle when engaged in picnicing, sports activities, resting at the beach, other forms of recreational activity such as playing cards, etc., and also for commercial purposes.

It is another objective of this invnetion to provide a universal mechanism for attaching vertical supports to the bumper of any existing established motor vehicle which vertical supports may or may not be a part of the awning support of this invention.

This, together with other objects and advantages of the invention should become apparent in the details of the invention as set forth in the accompanying drawings and as more fully described hereinafter and claimed.

BRIEF DESCRIPTION OF THE DRAWINGS

FIG. 1 is a perspective view showing the awning assembly attached to the rear bumper of an automobile and to the rear wheel wells of the vehicle, with a portion of the awning cut away to show some of the details of construction.

FIG. 2 is a detailed side elevation view of the universal attaching mechanism for attaching the awning vertical posts to the bumper of a motor vehicle.

DETAILED DESCRIPTION OF THE INVENTION

Figure 3:
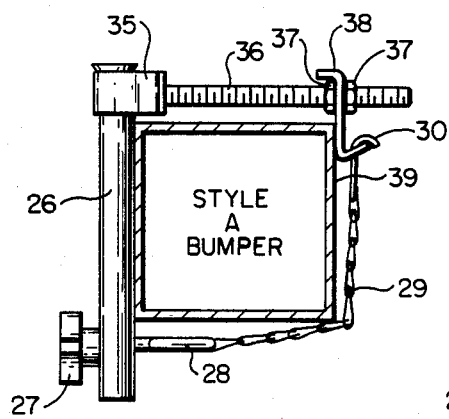
FIG. 3 is a side elevation view of the universal attaching mechanism attached to bumper Style A.
Figure 4:
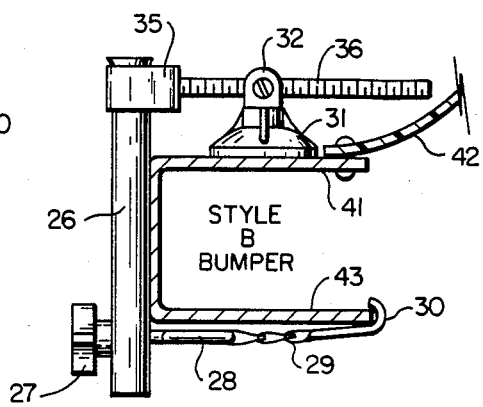
FIG. 4 is a side elevation view of the universal attaching mechanism attached to bumper Style B.

Referring now more particularly to FIG. 1, there is shown in perspective, the awning positioned on the rear bumper of an automobile with vertical support members 9—9 securely fastened in universal bumper attaching members 10—10. Vertical support members 9—9 have posts 11—11 fixedly connected thereto by friction and which are provided with right angled portions at the uppermost ends thereof shown at 12—12. Portions 12—12 of posts 11—11 are connected together by rods 13—13 elastically connected so that they may be disassembled for storage. Similar rods 14—14 are connected to rods 17—17 and are slidably positioned on posts 11—11 and may be secured against movement by means of pressure knobs 18—18. Slots 15 and 15A are located in awning 16, respectively, at a mid-point in the awning and at the cantilevered end of the awning. Rods 13—13 are positioned in slot 15 and rods 14—14 are positioned in slot 15A. Wind supports 19—19 are provided connecting members 17—17 with members 11—11. The remaining portion of awning 16 designated as 20 is connected to adjustable straps 21—21 which are held by means of hooks 22—22 to the wheel wells 23—23 of the motor vehicle shown generally at 24.

In operation, the universal attaching posts 10—10 are attached to the bumper shown at 25 and the posts 9—9 are inserted therein. Posts 11—11 are then inserted in posts 9—9 and members 13—13 are inserted in slot 15 in awning 16 and also in vertical members 11—11. Cantilevered members 17—17 having been previously attached to vertical members 11—11 have inserted therein supports 14—14 which are inserted in the slot 15A of awning 16. The knobs 18—18 are tightened so as to provide the proper elevation of awning 16 and the awning portion 20 is securely attached to wheel wells 23—23 by means of adjustable straps 21—21 and hooks 22—22.

Referring now more particularly to FIG. 2, there is shown a detailed side elevation view of the universal attaching mechanism attaching the awning vertical posts to the bumper of the motor vehicle. This comprises a vertical hollow rod 26, a threaded knob 27 connected to a hook 28, a chain 29 provided with a double hook 30, a suction member 31 connected to a swivel hinge connection 32 which is in turn connected to a bolt 33 connected to a nut 34 through the rod 26. Also positioned on vertical rod 26 is an annular sleeve 35 connected to a threaded member 36 which in turn is fitted with double nuts 37—37 and S-shaped member 38, secured therebetween.

Referring now more particularly to FIGS. 3-7, there are shown the five forms of bumpers for existing established motor vehicles.

Referring now more particularly to FIG. 3, and utilizing the universal attaching mechanism on Style A bumper 39, which is shown in cross-section, vertical rod 26 is positioned adjacent to the outward extending portion of the Style A bumper 39. Suction member 31 and its associated swivel hinge connection 32, bolt 33 and nut 34 have been removed. Annular sleeve 35 is positioned just above the bumper 39 and threaded member 36 is positioned extending rearwardly over the bumper. Threaded double nuts 37—37 are adjusted so that S-shaped member 38 will be positioned snugly against the rear of the bumper. The double hook 30 is inserted in the holes 40—40 of S-shaped member 38 (see FIG. 2) and double hook 30 is placed on chain 29 so that the chain 29 will fit snugly around the bumper and may be drawn tightly by means of the hook 28 and turning threaded knob 27 connected thereto. This provides for a snug fit of the universal attaching mechanism around Style A bumper 39, Referring now to FIG. 4, there is shown Style B bumper 41 which is provided with a connecting portion 42 to the frame of the automobile 24. In this case, vertical rod 26 is positioned adjacent to the rear portion of the bumper 41 with suction member 31 and swivel hinge connection 32, bolt 33 and 34 removed therefrom. Suction member 31 is connected to threaded member 36 by means of swivel hinge connection 32 which has been removed from bolt 33 and suction member 31 is forced into bumper gripping engagement with the upper portion of bumper 41. Double hook 30 is connected to the lower edge 43 of bumper 41 with appropriate adjustment being made in the length of chain 29 so that when hook 28 is tightened by means of turning threaded knob 27 the vertical rod 26 will be held firmly against bumper 41.

Figure 5:
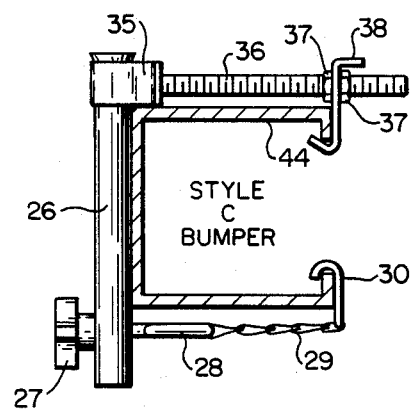
FIG. 5 is a side elevation view of the universal attaching mechanism attached to bumper Style C.

Referring now to FIG. 5, the universal attaching mechanism is shown attached to Style C bumper 44. In this instance the suction member 31, swivel hinge connection 32, bolt 33 and nut 34 have been removed from vertical rod 26 and vertical rod 26 is positioned against the outwardly extending edge of the bumper. S-shaped member 38 is reversed on threaded member 36 and double nuts 37—37 are adjusted so that S-shaped member 38 may engage the rearwadly extending lip of bumper 44. Double hook 30 is placed over the lower rear lip of bumper 44, chain 29 is appropriately adjusted so that when it is attached to hook 28 and knob 27 is turned vertical rod 26 will be snugly held against bumper 44.

Figure 6:
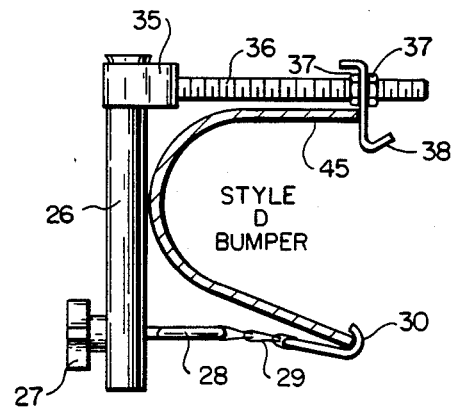
FIG. 6 is a side elevation view of the universal attaching mechansim attached to bumper Style D.

Referring now to FIG. 6, there is shown Style D bumper 45 in cross-section. In this instance S-shaped member 38 is placed in the same position as in FIG. 3 and double nuts 37—37 are adjusted on threaded member 36 so that S-shaped member 38 will abut the upper rearwardly extending portion of bumper 45 when vertical rod 26 abuts the outward extending portion of bumper 45. Double hook 30 is placed over the lower extending portion of bumper 45 and chain 29 is appropriately adjusted to connect with hook 28 so that when knob 27 is turned the vertical rod 26 will be held in a vertical position snugly against bumper 45.

Figure 7:
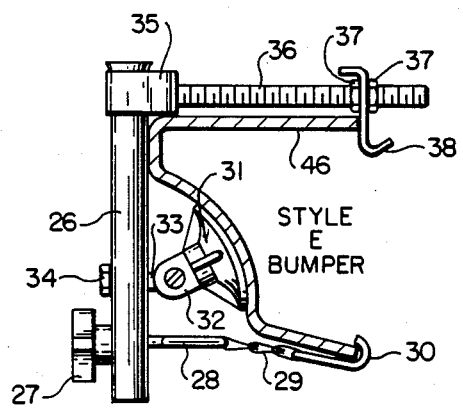
FIG. 7 is a side elevation view of the universal attaching mechanism attached to bumper Style E.

Referring now to FIG. 7, Style E bumper 46 is shown. In this case, the suction member 31, swivel hinge connection 32, bolt 33, and nut 34 remain on rod 26 and suction memberr 31 is placed in suction engaging relationship with the inward curving portion of bumper 46. Vertical rod 26 is positioned snugly against the upper vertical portion of bumper 46 and double nuts 37—37 are adjusted so that S-shaped member 38 fits snugly against the upper portion of bumper 46. Double hook 30 is hooked over the lower portion of bumper 46, chain 29 is adjusted so that when attached to hook 28 and knob 27 is tightened, vertical rod 26 will be held snugly against bumper 46 in an upright position.

While the universal attaching mechanism hereinabove described has been particularly identified in using and supporting the awning 16 and associated framework, it should be recognized that this universal attaching mechanism may be used for many other purposes such as holding bike racks, signs, or other items on the bumper of a motor vehicle.

While this invention has been described in its preferred embodiment, it should be remembered variations therefrom may remain without departing from the true scope and spirit of the invention.

What is claimed is:

1. An awning adapted to be attached to the bumper of a motor vehicle, comprising first means fixedly attached to the bumper of said motor vehicle, vertical support posts removably attached to said first means, a first horizontal support rod attached to the upper ends of said vertical support posts, said support rod being removably attached to an awning, cantilevered vertically adjustable rods atached to said vertical support posts and extending at right angles to said bumper plane, a second horizontal support rod attached to the outer ends of said cantilevered vertically adjustable rods, said second horizontal support rod being removably attached to the outer end area of said awning, said awning's opposite end being provided with means for removable attachment to said motor vehicle's wheel wells.

2. The awning of claim 1 wherein said vertical support posts comprise more than one portion.

3. The awning of claim 1 wherein said horizontal support rods are positioned in slots in said awning.

4. The awning of claim 1 wherein said cantilevered vertical adjustable rods are slidingly attached to said vertical support posts and may be positioned by increasing the sliding friction between said cantilevered vertical adjustable rods and said support posts.

5. The awning of claim 1 wherein said means for removable attachment of said awning's opposite end comprises hooks on elastic members for removable attachment to said motor vehicle's wheel wells.

* * * * *